A. MANSON.
GRIPPING DEVICE FOR SECURING AUXILIARY OR SPARE RIMS TO AUTOMOBILE WHEELS.
APPLICATION FILED JULY 1, 1909.
1,012,879.
Patented Dec. 26, 1911.
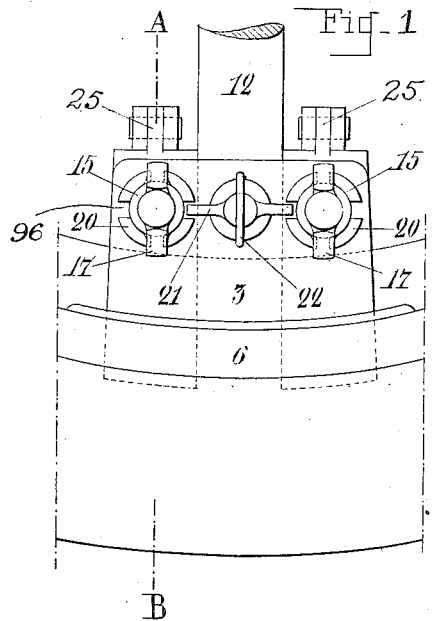
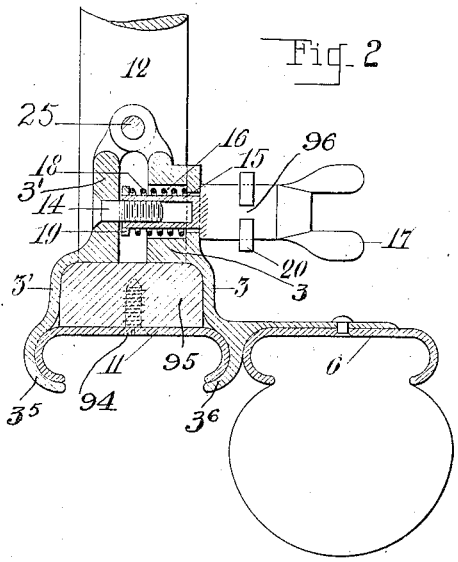
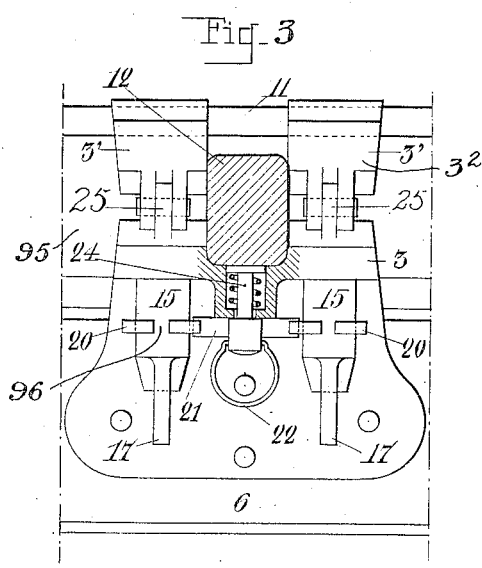
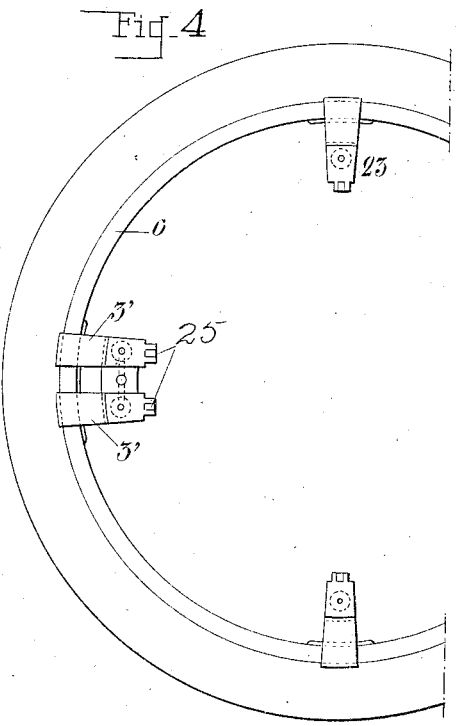
WITNESSES.
INVENTOR,
ALBERT MANSON,
Attorney.

UNITED STATES PATENT OFFICE.

ALBERT MANSON, OF PARIS, FRANCE.

GRIPPING DEVICE FOR SECURING AUXILIARY OR SPARE RIMS TO AUTOMOBILE-WHEELS.

1,012,879.  Specification of Letters Patent.  Patented Dec. 26, 1911.

Application filed July 1, 1909. Serial No. 505,443.

*To all whom it may concern:*

Be it known that I, ALBERT MANSON, citizen of France, residing at Paris, in the said Republic, have invented new and useful Improvements in Gripping Devices for Securing Auxiliary or Spare Rims to Automobile-Wheels, (for which I have obtained a patent in France, No. 392,581, bearing date of July 23, 1908, and a patent of addition in France, No. 10,090, of November 21, 1908,) of which the following is a specification.

This invention relates to a gripping device for securing auxiliary or spare rims to automobile wheels.
This gripping device is formed of two metal plates applied one upon another, means being afforded for preventing the slipping of that part of the said gripping device, which is not fixed to the principal rim, thus preventing the possibility of the device becoming unusable.

To enable the invention to be better understood, it is illustrated in the accompanying drawing as follows:
Figure 1 shows a side elevation (seen from the right side of Fig. 2) of parts of a wheel and tire and of the said gripping device; Fig. 2 is a transverse section of the same, on the line A—B of Fig. 1; Fig. 3 is a plan of the same partly in horizontal section; Fig. 4 is a partial elevation of a wheel provided with an auxiliary rim held by jaws constructed according to the present invention.
The same reference letters relate to the same elements in the various figures.

According to the present invention, the gripping device consists of two jaws connected by means of a hinge, which enables them either to be closed toward one another, in order to fix them upon the rim of an automobile wheel, or to be opened to remove them from this rim, the operation of the two jaws being effected by means of screw bolts and nuts, held in each of the jaws, respectively preventing their being lost, and the construction also having a spring device which normally prevents the screws from working loose. In order to have these grips bestride a spoke of the wheel (so as to give them the greatest possible security and to prevent them sliding upon a rim), it is desirable to divide one of the jaws into two parts which will lie, one on each side of the spoke, or to have two like jaws for that purpose.

Referring to the drawing, it will be seen that 11 marks the principal rim, secured to a wheel 95 as by screws 94; 6 is the auxiliary rim, and 12 a spoke of a wheel, while 3, 3' indicate jaws, 3 being the jaw fixed to the auxiliary rim and 3' the jaw connected to the foregoing by means of a hinge 25. Each jaw has a portion, 3⁵, 3⁶, curved or formed to clamp or fit to a part of the vehicle rim 11, and each jaw also has a side portion, 3³, 3⁴, conforming to and for clasping the wooden part 95 of the wheel. The jaws are provided with a series of screw bolts and nuts for engagement therewith, for the purpose of gripping the principal rim 11, and said bolts and nuts are arranged as follows. In the jaw 3' (or, rather, in each of the parts of this jaw, when—as shown in Fig. 3—it is divided into two parts, 3', 3², which pass one on each side of a spoke of the wheel) there is secured a bolt 14, while the jaw 3 carries a like number of corresponding thumb-turned nuts. These nuts comprise a threaded bar 15 (Fig. 2), placed in a corresponding opening 16 of the same jaw and having a head provided with wings 17. A spring 18 placed around the bar 15, and held in place by a washer 19 which confines this nut, and serves to cause it to spring out of its recess 16 and toward the bolt 14. The head of the nut has also a washer 20 provided with slots, 96, which when engaged by wings 21 of a bolt, 24 prevents the screws 15 from becoming loose. This bolt 24 comprises a catch, 21, on the spring rod 24 and is provided with a ring 22 by means of which the wings of the catch 21 can be turned and caused to engage with or disconnect from the slots (96) of the washers 20, which are thus locked in position by the screws which carry them.

In order to more perfectly secure the auxiliary rim upon the principal rim, I may use two additional simple jaws 23 formed in the same manner as before and which are shown as single instead of being double.

What I claim is:

1. In a device for attaching an additional rim to a vehicle wheel, a clamp composed of a double pair of hinged jaws each jaw having a curved portion for clamping to a part of a vehicle rim, and with side portions for clasping a wooden portion of the vehicle rim, the double pair of jaws being formed to clasp a wheel spoke between the same, in combination with bolts and corresponding spring controlled thumb turned nuts holding the jaws in place, and also holding the spoke securely within the jaws.

2. In a device for attaching an additional rim to a vehicle rim, a pair of hinged jaws, an additional rim rigidly attached to one of the jaws, each jaw being provided with a portion for fitting to a portion of the rim and with another portion for fitting to a wooden rim of the vehicle, in combination with bolts and corresponding spring controlled thumb turned nuts, for holding said jaws to the wheel.

In testimony whereof I have signed my name to this specification in the presence of two subscribing witnesses.

ALBERT MANSON.

Witnesses:
    JULES FAYOLLET,
    EUGENE PICHON,